United States Patent
Nakaya

(10) Patent No.: US 11,512,731 B2
(45) Date of Patent: Nov. 29, 2022

(54) BOLT-NUT

(71) Applicant: NAKAYA SEISAKUSHO CO., LTD., Yokohama (JP)

(72) Inventor: Takayoshi Nakaya, Yokohama (JP)

(73) Assignee: NAKAYA SEISAKUSHO CO., LTD., Yokohama (JP)

( * ) Notice: Subject to any disclaimer, the term of this patent is extended or adjusted under 35 U.S.C. 154(b) by 365 days.

(21) Appl. No.: 16/754,387

(22) PCT Filed: Aug. 30, 2019

(86) PCT No.: PCT/JP2019/034240
§ 371 (c)(1),
(2) Date: Apr. 8, 2020

(87) PCT Pub. No.: WO2021/038858
PCT Pub. Date: Mar. 4, 2021

(65) Prior Publication Data
US 2021/0062856 A1 Mar. 4, 2021

(51) Int. Cl.
*F16B 37/14* (2006.01)
*F16B 39/24* (2006.01)

(52) U.S. Cl.
CPC .............. *F16B 37/14* (2013.01); *F16B 39/24* (2013.01)

(58) Field of Classification Search
CPC ........ F16B 37/14; F16B 39/24; F16B 33/008; F16B 39/28; F16B 37/0857; F16B 37/002
See application file for complete search history.

(56) References Cited

U.S. PATENT DOCUMENTS 1,909,489 A * 5/1933 Eaton ...................... F16B 33/02
411/917
2003/0103832 A1 6/2003 Cords et al.

FOREIGN PATENT DOCUMENTS

| JP | S49-22356 U | 2/1974 | |
| JP | 9-72327 A | 3/1997 | |
| JP | 2002-168222 A | 6/2002 | |
| WO | WO-2019026253 A1 * | 2/2019 | .......... F16B 37/0857 |

OTHER PUBLICATIONS

Office action of the corresponding CN application No. 201980004837.4 dated Feb. 25, 2022 and English translation thereof.

* cited by examiner

Primary Examiner — Jacob M Amick
Assistant Examiner — Charles J Brauch
(74) Attorney, Agent, or Firm — Muncy, Geissler, Olds & Lowe, P.C.

(57) ABSTRACT

A bolt-nut (1) includes: a nut body (4) in a substantially cylindrical shape; plural nut divided bodies (4a); a cover body (5) in a substantially cylindrical shape for covering the nut body (4); a cover-side tapered portion formed on an inner wall of the cover body (5); a nut-side tapered portion (4a) formed such that an outer diameter of an outer wall of the nut body (4) is reduced toward one end portion thereof so as to correspond to the cover-side tapered portion; a spring (6) that is accommodated together with the nut body (4) in the cover body (5); and a nut (2) that includes a lid body (7) covering the other end portion of the cover body (5). A bolt screw as a ridge of the bolt and a nut screw as a ridge of the nut body (4) have unequal pitches that are different from each other.

3 Claims, 4 Drawing Sheets

BOLT-NUT

TECHNICAL FIELD

The present invention relates to a bolt-nut capable of exerting a specified effect due to structures of a bolt and a nut.

BACKGROUND ART

A bolt that is formed with ridges on an outer circumference of an elongated rod member has been known. Meanwhile, a nut is a substantially flat plate in a cylindrical shape, and is formed with ridges on an inner circumference thereof. The nut is threaded onto the bolt, and the bolt and the nut are used as a bolt-nut at various construction sites and the like. For example, a member is inserted through the bolt, the nuts are threaded onto both sides thereof, so as to hold and fix the member therebetween.

In such a bolt-nut, the bolt and the nut usually have equal pitches. Here, the pitch means a distance connecting centers of the adjacent ridges. That is, the bolt and the nut are formed to have equal pitches. By having the equal pitches as described above, the nut can move along the elongated bolt when being threaded from one end portion of the bolt.

However, when the bolt is long, it is bothersome and requires great effort to move and thread the nut. Furthermore, in the case where the bolt and the nut have the equal pitches, the nut moves from one direction of the bolt, and the nut is pressed against the opposing nut or the member and then fixed (fastened). At the time of this fastening, the bolt and the nut are fixed only by a pressing force that is generated by a plane contact therebetween from one direction of the ridges. At this time, in spite of having the equal pitches, the bolt and the nut are designed to have a slight clearance when the ridges of the bolt and the nut mesh with each other. Thus, even when the bolt-nut is fastened, the ridges on the one side have the clearance while the ridges on the other side contact tightly.

Accordingly, in the case where one of the nuts that hold the member therebetween is loosened, for example, the other nut is also loosened instantaneously, and the member is detached from the bolt. That is, in the case of the equal pitches, the nut cannot be held by the bolt by itself, and is naturally loosened.

Meanwhile, a bolt-nut that has equal pitches and facilitates the movement of the nut has been known. In the bolt-nut, the nut is divided and slid along the bolt (for example, see Patent Document 1). However, such a problem remains that the nut is loosened by itself due to the equal pitches.

CITATION LIST

Patent Document

Patent Document 1: JP-A-2002-168222

SUMMARY OF INVENTION

Problem to be Solved by Invention

As described above, the current bolt-nut has various problems, and a new problem is found this time. As an actual use form of the bolt-nut, after the member is fixed to the bolt by the nut, a surface of the bolt-nut is frequently painted. In the case where the bolt-nut is painted in the state where the nut is threaded onto and fixed to the bolt, surfaces of the ridges of the bolt other than the ridges onto which the nut is fixed are covered with a film of a paint (a paint film), and the bolt is brought into a state where the ridges are crushed. In such a case, the nut cannot be detached from the bolt (the nut cannot move while being threaded onto the bolt). Thus, these have to be discarded as is in the case of dismantlement of a structure or the like. In this case, the paint film is not formed on the ridges of the nut. Thus, the nut itself can be re-used. However, since the nut cannot be detached from the bolt due to the above-described reason, it is a waste of a resource. The same applies to a case where the ridges of the bolt are crushed or rusted due to aged deterioration in addition to the case where the nut cannot be detached due to the paint film. This problem occurs in the actual use form, and is an extremely serious issue today in a situation where re-use of the nut is desired for resource conservation.

The present invention has been made in view of the above related art, and has a purpose of providing a bolt-nut capable of easily detaching a nut for re-use even when ridges of a bolt are deformed due to aged deterioration or post-processing, capable of keeping a large fastening force, and capable of easily moving the nut even when pitches of the ridges of the bolt and the nut differ.

Means for Solving the Problem

In order to achieve the above purpose, the present invention provides a bolt-nut including a nut to be threaded onto a bolt, and includes: a nut body in a substantially cylindrical shape; plural nut divided bodies formed by dividing the nut body in a circumferential direction; a cover body in a substantially cylindrical shape for covering the nut body; a cover-side tapered portion formed such that an inner diameter of an inner wall of the cover body is gradually reduced toward one end portion of the cover body; a nut-side tapered portion formed such that an outer diameter of an outer wall of the nut body is reduced toward one end portion thereof so as to correspond to the cover-side tapered portion; a spring that is accommodated together with the nut body in the cover body and is disposed on another end portion side of the cover body; and a nut that includes a lid body covering the other end portion of the cover body. A bolt screw as a ridge of the bolt and a nut screw as a ridge of the nut body have unequal pitches that are different from each other.

Preferably, the nut has: a moving state where, when the bolt is inserted from an insertion hole that is formed in an end portion on a side where the cover-side tapered portion of the cover body is formed, the nut divided bodies are pressed against the spring to move to the lid body side; a meshing state where the nut divided bodies move to the insertion hole side by an urging force of the spring and the bolt screw and the nut screw loosely mesh with each other; and a fastened state where the nut is threaded in a direction of being pressed against an object disposed on the bolt so as to cause the nut divided bodies to further move to the insertion hole side and where the bolt screw and the nut screw tightly mesh with each other, and, in the meshing state, a surface of the nut screw located on an outer side at each end of the nut body is in contact with the bolt screw.

Preferably, the meshing state is a state where the nut is detached from the bolt when the bolt screw is deformed in the fastened state.

Effect of Invention

According to the present invention, the nut body (the nut divided bodies) moves within the cover body. During this movement, the bolt screw and the nut screw tightly mesh with each other or are loosened by the cover-side tapered portion and the nut-side tapered portion. Then, when meshing of the bolt screw and the nut screw is loosened, the nut body can move to the side where the inner diameter thereof is large (the end portion on the opposite side of the cover-side tapered portion) against the spring within the cover body. Thus, even when the bolt screw and the nut screw have the unequal pitches, the nut screw can easily move on the outer side of the bolt screw without being threaded thereon. Furthermore, due to the unequal pitches, when the nut is fastened, the screws bite each other and thus can maintain a large fastening force.

In particular, it is designed that a surface of the nut screw located on an outer side at each end of the nut body in the meshing state contacts the bolt screw. Thus, the screws can tightly mesh with each other effortlessly. In the extreme statement, apexes of ridges thereof are not located at the same position at the time of fastening. Thus, the screws can tightly mesh with each other effortlessly.

Even in the case where the ridges of the bolt are deformed due to rusting and crushing by aged deterioration, post-processing thereof by painting, or the like, the nut can easily be shifted from the fastened state to the meshing state when being slightly loosened, and the nut can move along the bolt. In this way, the nut can be detached for re-use. As a result, it is possible to reduce wasteful components and contribute to resource conservation.

BEST MODE FOR CARRYING OUT THE INVENTION

Figure 1:
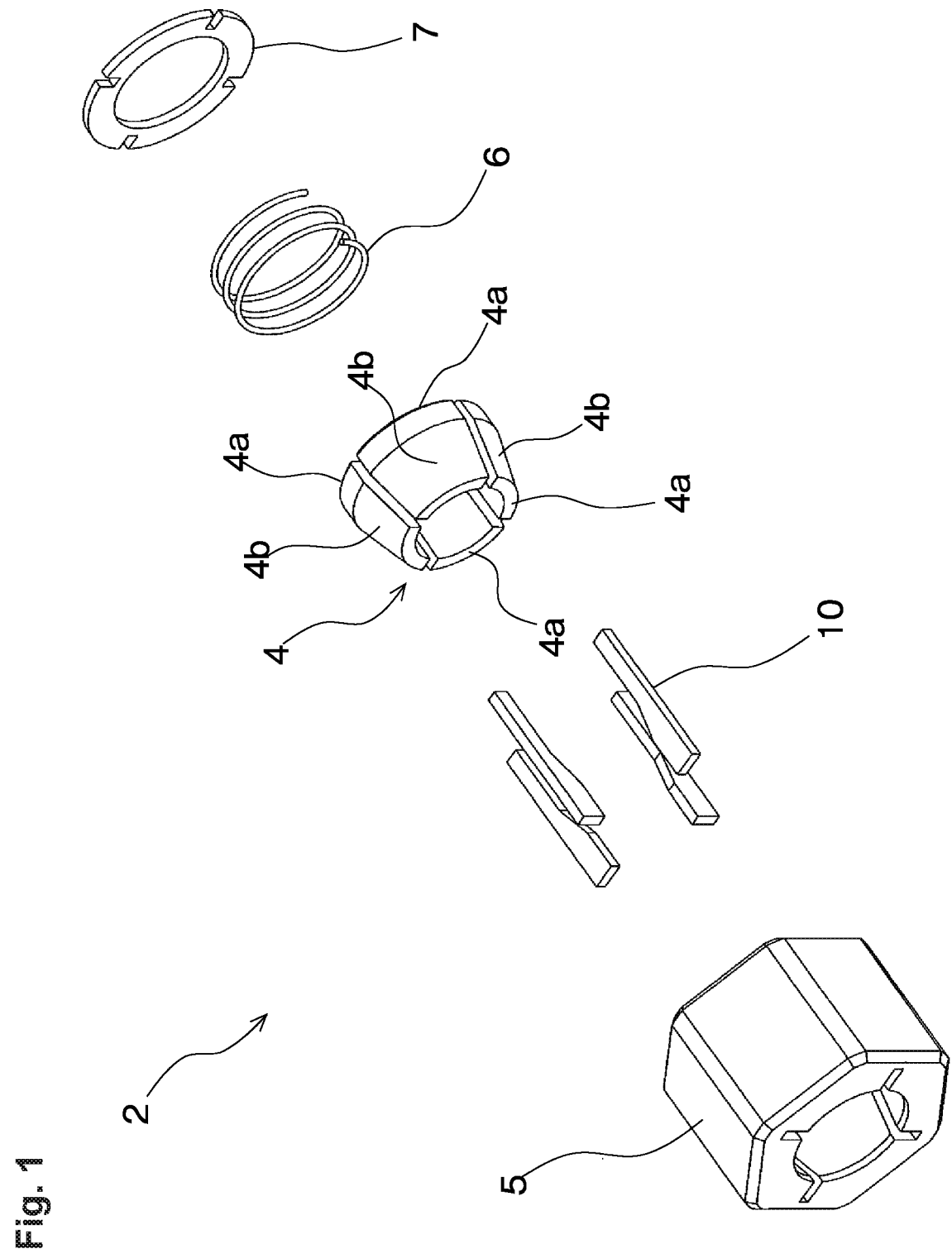
FIG. 1 is a schematic perspective view of a nut portion of a bolt-nut according to the present invention.
Figure 2:
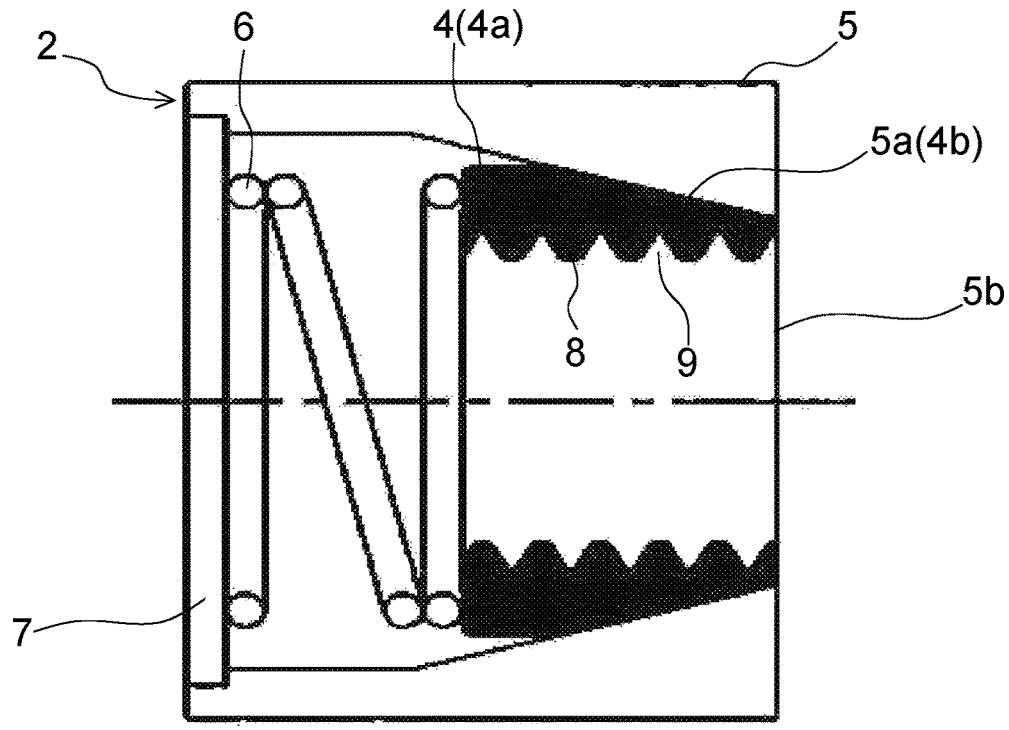
FIG. 2 is a schematic cross-sectional view of the nut portion of the bolt-nut according to the present invention.

As illustrated in FIG. 1 and FIG. 2, a nut 2 that is used for a bolt-nut 1 according to the present invention is threaded onto a bolt 3 as will be described later. This nut 2 includes a nut body 4 in a substantially cylindrical shape. The nut body 4 is divided in a circumferential direction, and is configured to include plural nut divided bodies 4a (four nut divided bodies 4a in the drawing). An outer circumferential surface of the nut body 4 is covered with a cover body 5 in a substantially cylindrical shape. That is, the nut body 4 and the cover body 5 define a double-cylinder shape. An inner wall of the cover body 5 is formed with a cover-side tapered portion 5a formed such that an inner diameter thereof is gradually reduced toward one end portion. This cover-side tapered portion 5a is formed from an intermediate portion of the inner wall in an axial direction of the cover body 5. In a manner to correspond to this cover-side tapered portion 5a, a nut-side tapered portion 4b is formed such that an outer diameter of an outer wall of the nut body 4 is reduced toward one end portion thereof.

A spring 6 is accommodated on the other end portion side of the cover body 5. That is, in the cover body 5, the nut body 4 is accommodated on the one end portion side (the cover-side tapered portion 5a side), and the spring 6 is accommodated on the other end portion side (an opposite side of the cover-side tapered portion 5a). This spring 6 is a compression spring in the example of the drawing. The other end portion of the cover body 5 is covered with a lid body 7. At this time, the nut body 4 is pressed to the cover-side tapered portion 5a side by the spring 6. This can be said as a specified state before the bolt 3 is inserted through the nut 2 and where the nut body 4 is pressed only by the spring 6. Note that, in order to limit a moving direction of the nut divided bodies 4a to the axial direction of the nut 2, a partition member 10 that extends in the axial direction of the nut 2 is disposed between each adjacent pair of the nut divided bodies 4a.

Figure 3:
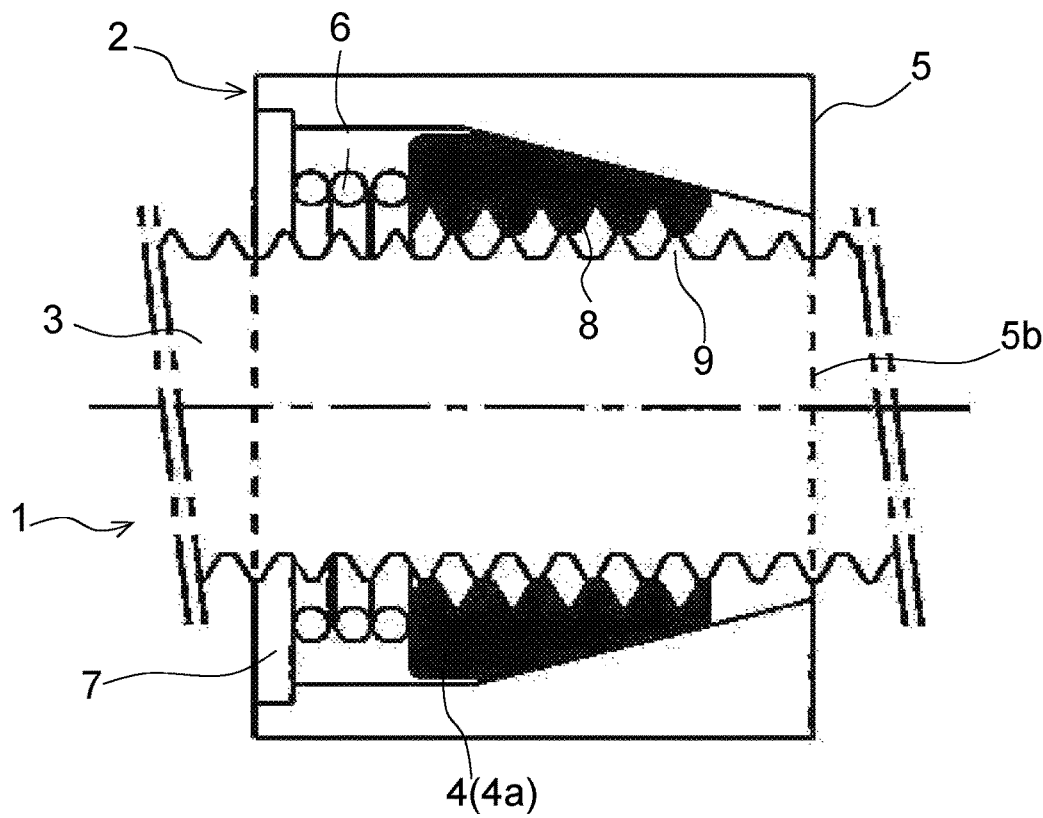
FIG. 3 is a schematic cross-sectional view of a moving state.
Figure 4:
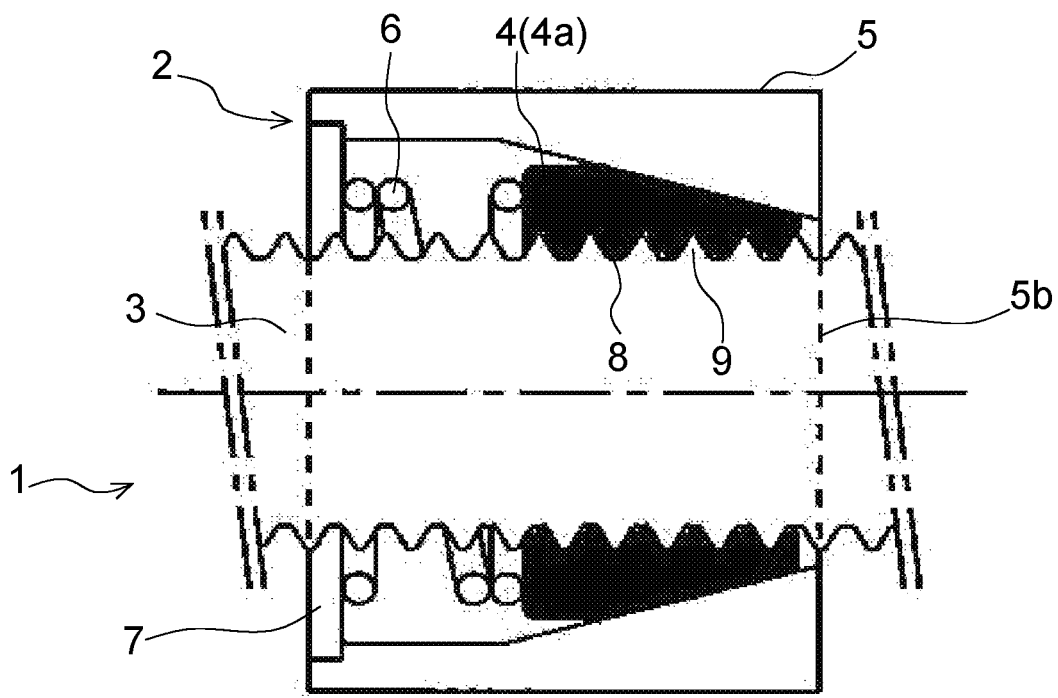
FIG. 4 is a schematic cross-sectional view of a meshing state.

As apparent with reference to FIG. 3 and FIG. 4, when the bolt 3 is inserted through the nut 2, the following moving state and meshing state are repeated. The bolt 3 is inserted into the nut 2 from an insertion hole 5b that is formed in the one end portion of the cover body 5. At this time, a nut screw 8 that includes plural ridges formed on an inner wall of the nut body 4 is pressed to the other end portion side of the cover body 5 by a bolt screw 9 that includes plural ridges formed on an outer wall of the bolt 3. When the nut screw 8 is pressed, just as described, the nut body 4 (each of the nut divided bodies 4a) moves against the spring 6 to the other end portion side of the cover body 5. At this time, the nut body 4 moves while expanding outward along the cover-side tapered portion 5a. Thus, when the nut body 4 expands to a certain extent, the bolt screw 9 moves over the nut screw 8. Then, due to the spring 6, the nut body 4 moves in an inward direction of the cover body 5 and to the one end portion side of the cover body 5 again along the cover-side tapered portion 5a. Then, the next ridge of the bolt screw 9 presses the nut screw 8 to the other end portion side of the cover body 5 again, and the bolt screw 9 moves over the nut screw 8 again. By repeating this, the nut 2 is not threaded onto the bolt 3, and the bolt 3 can easily be inserted through the nut 2.

As described above, the state where, when the bolt 3 is inserted from the insertion hole 5b that is formed in the end portion on the side where the cover-side tapered portion 5a of the cover body 5 is formed, the nut divided bodies 4a are pressed against the spring 6 to move to the lid body 7 side is the moving state. In addition, the state where the nut divided bodies 4a move to the insertion hole 5b side by an urging force of the spring 6 and the bolt screw 9 and the nut screw 8 loosely mesh with each other is the meshing state. The state until the bolt screw 9 moves over the nut screw 8 is the moving state. The state after the bolt screw 9 moves over the nut screw 8 and where the nut divided bodies 4a are pressed by the spring 6 and return to the insertion hole 5b side is the meshing state. The insertion of the bolt 3 through the nut 2 means that, when the moving state is shifted to the meshing state, the bolt 3 is inserted, the meshing state is shifted to the moving state again, and such states are repeated.

Figure 5:
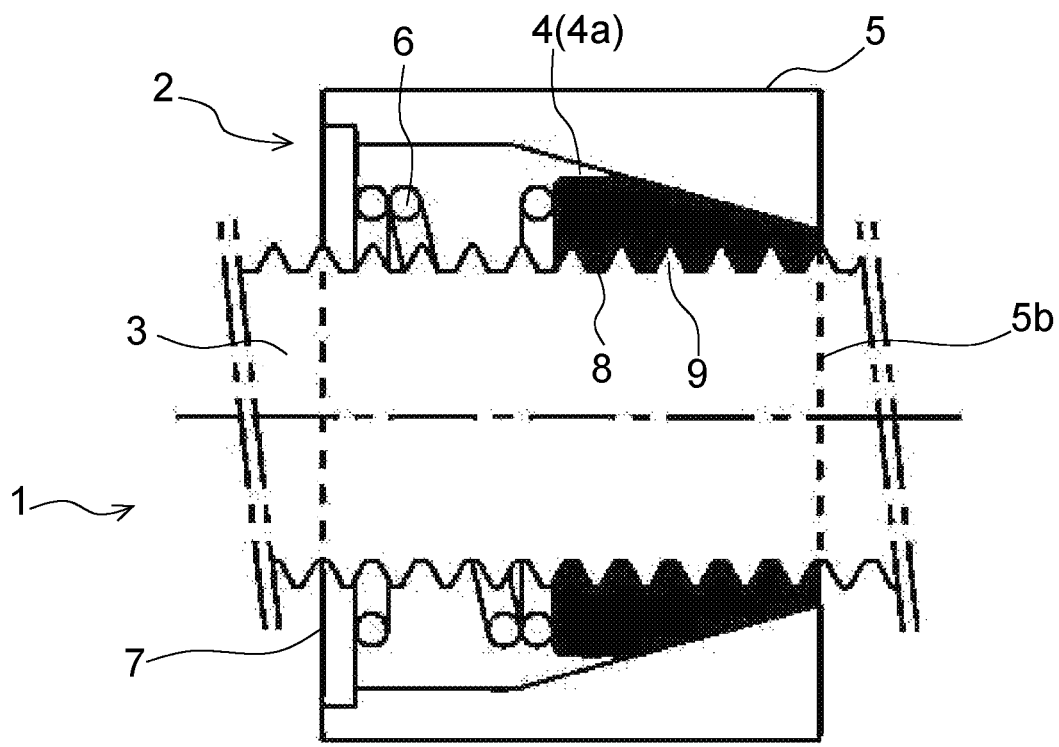
FIG. 5 is a schematic cross-sectional view of a fastened state.

When the nut 2 moves to a specified position on the bolt 3, the nut 2 is fixed onto the bolt 3 as the fastened state illustrated in FIG. 5. Such a case corresponds to a case where the bolt 3 abuts an object (not illustrated) as a particular member or the like that is inserted through the nut 2 and disposed thereon. The nut 2 is fastened in the state of abutting this object. In this way, the object is held and fixed between this nut 2 to be fastened and a nut or a bolt head on the opposite side. At the time of fastening, just as described, the nut 2 is first in the meshing state. Since the bolt 3 is not inserted therethrough, the nut body 4 moves to an inner side of the cover body 5 to a certain extent along the cover-side tapered portion 5a by the spring 6, and the nut screw 8 and the bolt screw 9 are brought into a loosely meshing state. In this state, when the nut 2 is threaded (the cover body 5 rotates in a threading direction to cause rotation of the nut body 4) in a direction of pressing against the object disposed on the bolt 3, the nut 2 moves while being threaded onto the bolt 3. This means that the nut divided bodies 4a further move to the insertion hole 5b side, that the nut body 4 is located on the innermost side of the cover body 5 along the cover-side tapered portion 5a, and that the nut body 4 is located closest to the insertion hole 5b side. That is, a state where the bolt screw 9 and the nut screw 8 tightly mesh with each other is this fastened state.

In the bolt-nut 1 according to the present invention, pitches of the bolt screw 9 and the nut screw 8 differ. That is, the bolt screw 9 and the nut screw 8 have the unequal pitches. Due to the unequal pitches, a clearance is not provided at the same position between each pair of the ridges. The position where the bolt screw 9 and the nut screw 8 contact each other differs between the adjacent ridges, and thus a mutual fastening force acts in various directions. In other words, in the fastened state, due to the unequal pitches, the screws 8, 9 bite each other and thus can maintain a large fastening force. By using these unequal pitches, the bolt-nut 1 can also use a friction force that is generated by meshing of the ridges. This exerts a large meshing effect. In addition, since the nut 2 as described above is fixed to the bolt 3 by itself, it is possible to lower a risk of falling of the target such as the member. That is, in the case where the nuts 2 are used to hold the target therebetween on the bolt 3, one of the nuts 2 is not loosened even when the other nut 2 is loosened. The other nut 2 is fixed to the bolt by itself and can hold the target on the bolt 3 to prevent falling of the target. In the fastened state, plastic deformation that does not exceed a limit of elasticity occurs to both of the bolt screw 9 and the nut screw 8, and thus both of the bolt screw 9 and the nut screw 8 are not loosened.

In addition, it is configured that, at this time, the moving state and the meshing state as described above are repeated to facilitate the movement of the nut 2 with respect to the bolt 3. Thus, even when the bolt screw 9 and the nut screw 8 have the unequal pitches, it is unnecessary to thread the nut 2 onto the bolt 3 while moving the nut 2 with respect to the bolt 3. That is, it is possible to prevent the movement of the nut 2 with respect to the bolt 3 from being stopped in the case where the unequal pitches are provided for the large fastening force (when the unequal pitches are provided, the nut cannot be threaded onto and move along the bolt).

Figure 6:
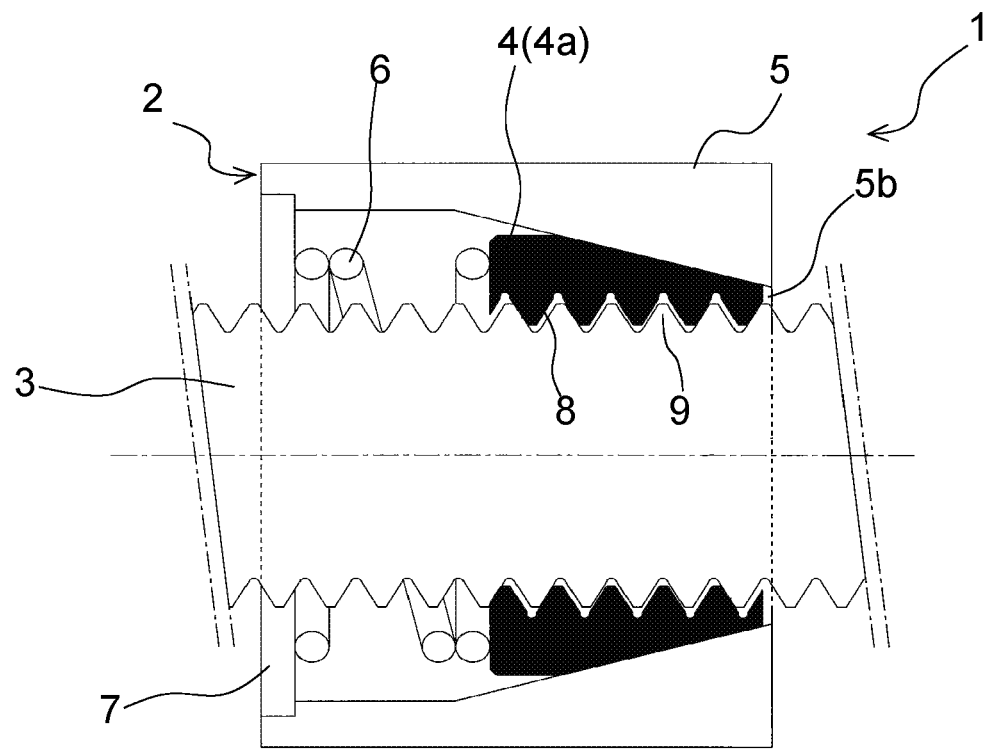
FIG. 6 is a schematic cross-sectional view of the meshing state having unequal pitches.
Figure 7:
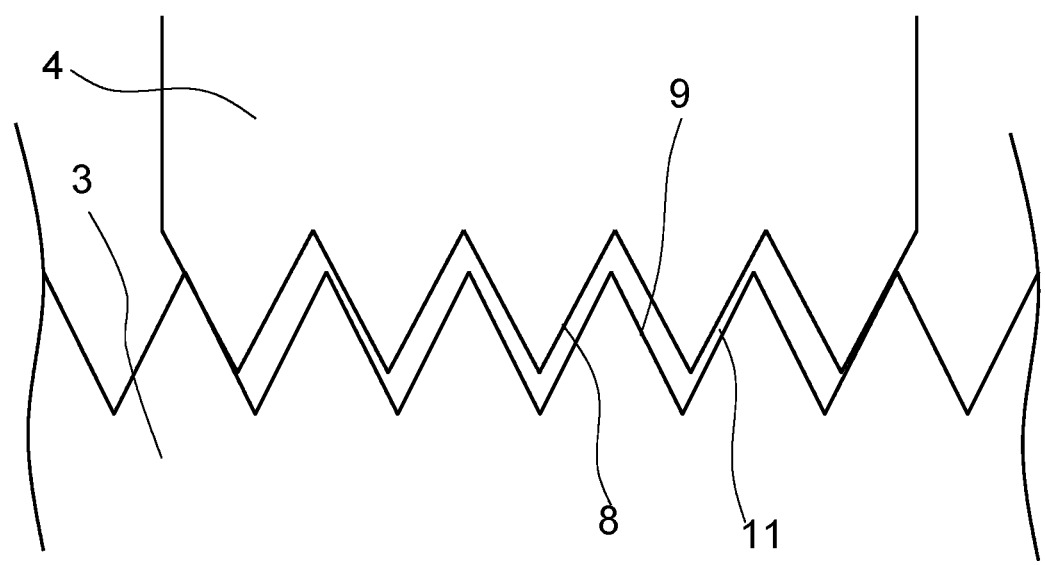
FIG. 7 is a schematic enlarged view of the unequal pitches.

The idea of the unequal pitches is further deepened in the present invention. It is insufficient to simply set the nut screw 8 and the bolt screw 9 to have the unequal pitches. The unequal pitches as the technical idea of the present invention not only achieve the large fastening force that is generated when the screws 8, 9 bite each other, but also are devised to improve workability in order to efficiently generate the large fastening force. More specifically, as apparent with reference to FIG. 6, the present invention adopts such unequal pitches that a surface of the nut screw 8, which is located on an outer side at each end of the nut body 4, contacts the bolt screw 9 in the meshing state. A detailed description will be made with reference to FIG. 7. For example, in the case where a surface of the ridge of the nut screw 8 that is closest to the insertion hole 5b side is in contact with the bolt screw 9, a slight clearance is produced between the ridge of the adjacent nut screw 8 and the bolt screw 9 on the insertion hole 5b side (a clearance 11 in FIG. 7). The clearance is further increased for the nut screw 8 next to the adjacent screw 8, and is even further increased for the nut screw 8 next to the next adjacent screw 8. On the contrary, the clearance on a reverse side (the opposite side of the insertion hole 5b) is gradually reduced. At last, on the opposite side of the insertion hole 5b, the surfaces of the ridges of the nut screw 8 and the bolt screw 9 contact each other. The nut screw 8 that comes into contact for the first time on the opposite side of the insertion hole 5b is the nut screw 8 located farthest end on the opposite side of the insertion hole 5b of the nut 2, and the nut 2 (the nut body 4) is no longer formed with the ridges beyond such a nut screw 8 on the opposite side of the insertion hole 5b. In other words, the nut body 4 only has the single nut screw 8, which contacts the bolt screw 9, on the outer side at each of the ends. With such design, the screws 8, 9 can tightly mesh with each other effortlessly. In the extreme statement, apexes of the ridges thereof are not located at the same position at the time of fastening. Thus, the screws can tightly mesh with each other effortlessly.

In addition to the unequal pitches of the screws 8, 9 and repeating of the moving state and the meshing state, which facilitate the nut 2 to move along the bolt 3, the present invention further has the following technical idea to exert further advantageous effects. More specifically, the meshing state is based on such an idea to easily detach the nut 2 from the bolt 3 when the bolt screw 9 is deformed in the fastened state. Here, the deformation of the bolt screw 9 includes rusting and crushing due to aged deterioration of the ridges of the bolt screw 9, post-processing thereof by painting, and the like. Even in the case where the ridges of the bolt screw 9 are deformed due to any of these reasons, the nut 2 can easily be shifted from the fastened state to the meshing state when being slightly loosened. By repeating the moving state and the meshing state thereafter, the nut 2 can easily move along the bolt 3. In this way, the nut 2 can be detached for re-use. As a result, it is possible to reduce wasteful components and contribute to resource conservation. In detail, for example, in the post-processing by painting, the nut 2 is painted after being fastened to the bolt 3. In such a case, the bolt screw 9 is thickened by a paint film except for a portion on which the nut 2 is disposed. Thus, the nut 2 cannot normally move and be threaded. This fact has prevented the re-use of the nut 2. However, in such a case, the nut can be used.

The invention of the present application is not a simple combination of the large fastening force, which is generated by using the friction force by the unequal pitches, and the facilitation of the movement of the nut in a diameter-increasing direction along the bolt. First, in the case where the unequal pitches are simply adopted, the nut 2 cannot be threaded and move to the specified position on the elongated bolt 3. This is because, due to the difference in the pitch of the ridges, the nut 2 can no longer move at an intermediate position while meshing with the bolt 3. In the related art, the specific examination has not been made on the most preferred aspect of the unequal pitches. That is, the unequal pitches of the bolt-nut are only known to be "unequal" with respect to "equal" in the general idea. In reality, the bolt-nut having the unequal pitches has not been commercially available. The present invention is not devised simply on the basis of the idea of the unequal pitches, which is obtained from the idea of equal pitches, but is created from a technical perspective focusing on such a purpose that the nut 2 can move even with the paint film formed by the post-processing after fastening of the bolt-nut 1. Thus, a start point thereof is how to utilize the unequal pitches for commercialization from such a perspective.

REFERENCE SIGNS LIST

1: Bolt-nut
2: Nut
3: Bolt
4: Nut body
4*a*: Nut divided body
4*b*: Nut-side tapered portion
5: Cover body
5*a*: Cover-side tapered portion
5*b*: Insertion hole
6: Spring
7: Lid body
8: Nut screw
9: Bolt screw
10: Partitioning member
11: Clearance

The invention claimed is:

1. A bolt-nut comprising:
a nut to be threaded onto a bolt that has bolt threads projecting outward along an axis direction,
the nut including:
 a nut body in a substantially cylindrical shape wherein the nut body is configured with plural nut divided bodies formed by dividing said nut body in a circumferential direction wherein the nut body has a plurality of nut threads projecting inward, the nut threads being arranged from a proximal side to a distal side along a direction corresponding to the axis direction of the bolt;
 a cover body in a substantially cylindrical shape for covering the nut body;
 a cover-side tapered portion formed such that an inner diameter of an inner wall of the cover body is gradually reduced toward the distal side of said cover body;
 a nut-side tapered portion formed such that an outer diameter of an outer wall of the nut body is reduced toward the distal side thereof so as to correspond to said cover-side tapered portion;
 a spring that is accommodated together with the nut body in the cover body and is disposed on the proximal side of the cover body; and
 a lid body that covers an end portion of the cover body at the proximal side, wherein
the nut takes one of three states following, when the bolt is inserted from an insertion hole that is formed in an end portion of the cover body on the distal side:
 1) a moving state where the nut divided bodies are movable over the bolt threads along the axis direction while the nut divided bodies are pressed by the spring toward the distal side;
 2) a meshing state where the nut divided bodies are screwed toward the distal side from the moving state such that, crests of the nut threads do not meet roots of the bolt threads, the nut threads loosely meshing with the bolt threads, and the nut divided bodies are movable over the bolt threads along the axis direction wherein; and
 3) a fastened state where the nut divided bodies are further screwed toward the distal side from the meshing state such that the crests of the nut threads meet the roots of the bolt threads, fastening the nut divided bodies on the bolt, and the nut divided bodies are not movable over the bolt threads, and
a pitch of the nut threads is larger than a pitch of the bolt threads such that, under the meshing state, a flank of one nut thread that is located at the most distal side and a flank of one nut thread that is located at the most proximal side are in contact with flanks of the bolt threads.

2. The bolt-nut according to claim 1, wherein
the fastened state turns to the meshing state when the bolt threads are deformed in the fastened state so that the nut is detached from the bolt.

3. The bolt-nut according to claim 1, wherein
Only the flanks at the most distal side and the most proximal side among other flanks of the nut threads are in contact with the flanks of bolt threads.

* * * * *